April 26, 1927. 1,625,846
J. E. CHAMBERS
COOKING OVEN
Filed May 20, 1926
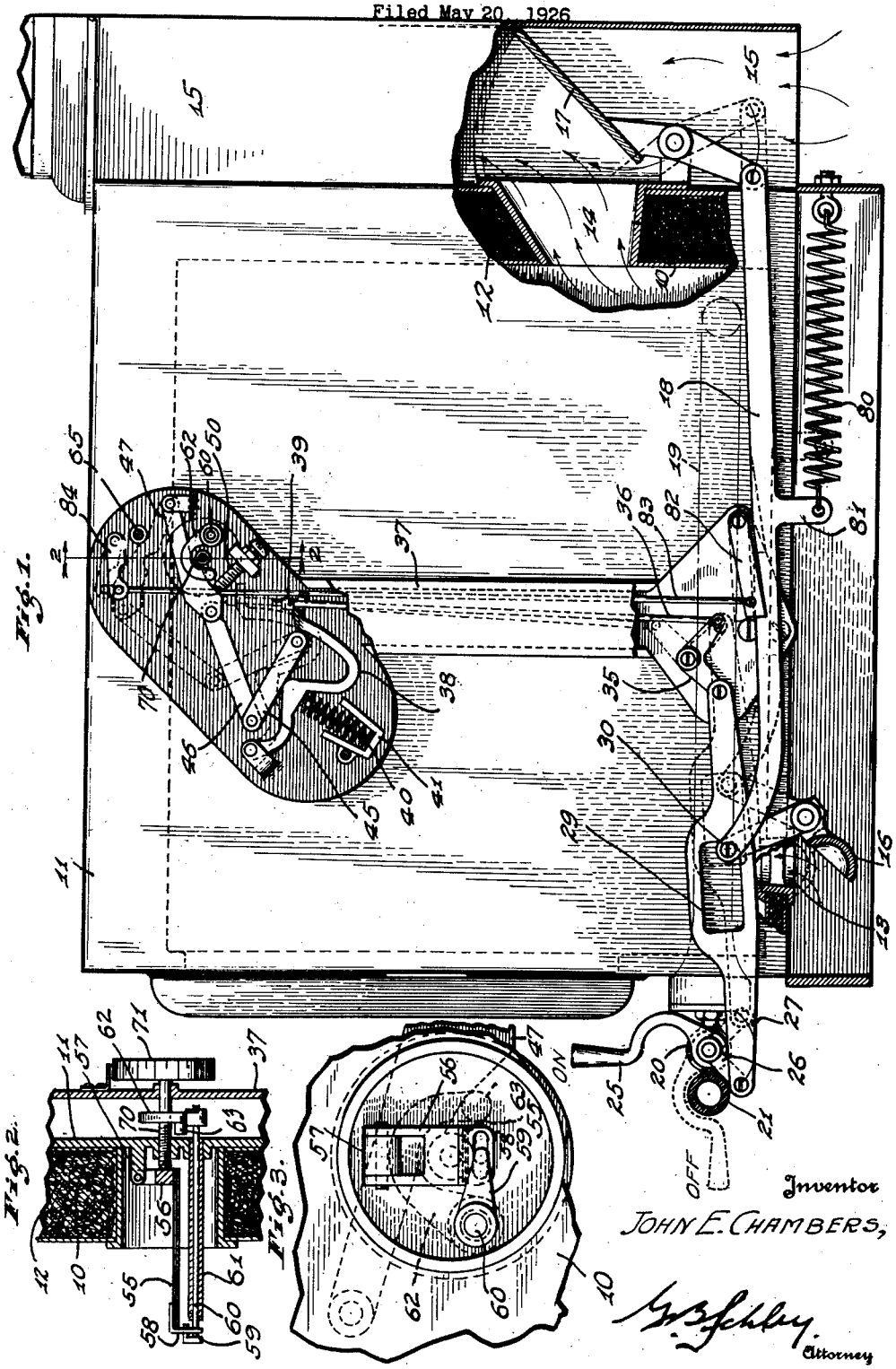
Inventor
JOHN E. CHAMBERS,
Attorney Patented Apr. 26, 1927.

1,625,846

UNITED STATES PATENT OFFICE.

JOHN E. CHAMBERS, OF SHELBYVILLE, INDIANA.

COOKING OVEN.

Application filed May 20, 1926. Serial No. 110,488.

My invention relates to an oven having a heating element and also having ventilating openings which are open when the heating element is in operation and closed when the heating element is shut off. Such an oven is preferably provided with heat-insulating walls in order to retard as much as possible the escape of heat after the heating element has been shut off.
It is the object of my invention to interconnect the ventilation control means of such an oven with the control means for the heating element, so that the ventilation openings will be open when the heating element is operating and closed when the heating element is shut off. A further object of my invention is to provide in combination with the aforesaid control means a temperature-responsive element which will operate to shut off the heating element and close the ventilating openings when the temperature within the oven has reached a predetermined value. A still further object of my invention is to employ suitable mechanism between the temperature-responsive element and the heating and ventilating control means so that the temperature-responsive element will not be required to exert more than a very small amount of force in effecting its control over the ventilation and heating control means.

I accomplish the above objects by interconnecting the heating-control means and the ventilation control means so that the latter will be closed automaticacally whenever the heating-control means is operated to shut off the heating element, and I provide a temperature-responsive mechanism for shutting off the heating element and closing the ventilation-control means whenever the temperature within the oven reaches a predetermined maximum. Preferably, the connection between the ventilation-control means and the heating control is such that the heating-control means may be operated to regulate the heating element, to an extent, without interfering with the position of the ventilation-control means.

The accompanying drawing illustrates my invention: Fig. 1 is a side elevation of an oven equipped with a device embodying my invention; Fig. 2 is a section on the line 2—2 of Fig. 1 showing details of the construction of the temperature-responsive element and its associated parts; and Fig. 3 is an end elevation of the parts illustrated in Fig. 2.

The oven to which my invention is applied preferably comprises an inner wall 10 and an outer wall 11, the space between such walls being filled with suitable heat-insulating material 12. Provision is made for ventilating the interior of the oven, and for this purpose I have shown the oven as provided with an air admission opening 13 and an air discharge opening 14, the latter leading into a suitable discharge flue 15. To control the flow of air through the oven, the discharge openings 13 and 14 are provided respectively with valves 16 and 17 which may conveniently be pivotally mounted and interconnected for joint operation by a link 18.

For the purpose of heating the oven I provide a suitable heating element which is illustrated in the drawing as consisting of a gas burner 19 connected through a valve 20 with a gas-supply pipe 21. The valve 20 has an operating handle 25 provided with an extension arm 26 pivotally connected to a link 27. The link 27 is connected with the ventilation-control means as by being provided with a slot 29 which receives a bolt 30 interconnecting the link 18 and the operating arm of the valve 16. The slot 29 in the link 27 makes it possible to adjust the valve 20 through a considerable range of adjustment without moving the ventilation-control valves 16 and 17, while still providing for the opening of the ventilation control means whenever the valve 20 is opened. However, means which are hereinafter described is provided for closing the valves 16 and 17 when the valve-handle 25 is moved to its "off" position.

To provide for the thermostatic control of the gas supplied to the burner 19, the link 27 is connected through a bell-crank 35 with a rod 36 which extends upward through a housing 37 mounted on the outer wall 11 of the oven. Near its upper end, the rod 36 passes loosely through a hole in a pivotally-mounted arm 38, and is provided above said arm with an abutment 39 for limiting the downward movement of the rod 36 relative to the arm 38. A spring 40 operating between a stationary abutment 41 and the arm 38 tends to move such arm and the rod 36 upward to close the control valve 20.

Upward movement of the arm 38 is normally prevented by its engagement with a link 45 which is pivotally mounted at one end in the casing 37. Rotation of the link 45 under the pressure exerted against it by the arm 38 is prevented by reason of the interconnection of the link 45 with a toggle formed by two pivotally interconnected links 46 and 47, the toggle-link 46 being pivotally connected to the link 45 and the toggle-link 47 being pivotally mounted on a stationary axis within the casing 37. An adjustable abutment screw 50 engages one link of the toggle, here shown as the link 47, and prevents collapsing of the toggle downwardly under the force exerted by the spring 40 through the arm 38 and link 45.

The temperature-responsive element which controls the gas-supply and the ventilation valves is located within the oven and is arranged so that when heated it exerts a force against the toggle-link 47 tending to move such link away from the abutment screw 50. By virtue of such construction the force which the temperature-responsive element must exert is only that required to move the toggle-link 47 sufficiently far to permit the toggle to collapse upwardly under the force exerted by the spring 40. The collapsing of the toggle permits the raising of the arm 38 and rod 36 and the closing of the gas-supply valve 20.

The temperature-responsive element which I prefer to use consists of a bi-metallic strip 55 mounted upon a stirrup 56 which is pivotally supported on a lug 57 projecting inwardly from the outer wall 11. The bi-metallic strip 55 extends into the interior of the oven and is there provided with a depending finger 58 which is longitudinally slotted to receive a pin on the end of an arm 59. The arm 59 is rigidly mounted on a shaft 60 supported in a suitable bearing 61 and extending through the outer wall 11 of the oven into the interior of the casing 37. Rigidly mounted on the outer end of the shaft 60 is an operating arm 62 provided with an abutment 63 which engages the lower side of the toggle-link 47.

As the temperature within the oven increases, the inner end of the bi-metallic strip 55 moves upward and causes a counter-clockwise rotation (Fig. 3) of the shaft 60 and arm 62 to move the toggle-link 47 away from the abutment screw 50. When this movement has progressed to a point where the pivotal interconnection between the toggle links 46 and 47 crosses the line between the pivotal axes of the opposite ends of such links, the toggle collapses under the pressure exerted by the spring 40 to the dotted line position shown in Fig. 1 of the drawing.

The collapsing of the toggle is limited by a suitable abutment in the form of a stop pin 65 mounted within the casing 37 in position to engage the toggle-link 47. The collapsing of the toggle permits upward movement of the arm 38 which, by reason of its engagement with the abutment 39 on the rod 36, carries the rod 36 with it, causing a counter-clockwise rotation of the bell crank 35 and the closing of the valve 20, thus shutting off the heating element.

Desirably some suitable means is provided for varying the temperature at which the toggle collapses to permit closing of the valve 20. For this purpose there is shown in the drawings an adjusting screw 70 which is mounted in the outer wall 11 of the oven in position to bear against the outer face of the stirrup 56. The adjusting screw 70 extends outward beyond the wall of the casing 37 and is there provided with a graduated adjusting knob 71. Rotation of the knob 71 and screw 70 varies the force exerted by the thermostat 55 on the arm 59, and thus varies the temperature at which the thermostat operates to collapse the toggle formed by the links 46 and 47.

For the purpose of automatically effecting the closing of the ventilating openings 13 and 14 when the valve 20 is closed, I provide a spring 80 which tends to move the valves 16 and 17 to closed position. As shown, the spring 80 is a tension spring acting between a stationary point and a projection 81 on the link 18. The valves 16 and 17 are held in open position against the force exerted by the spring 80 by means of a suitable latch 82 which may conveniently engage a notch on the upper side of the link 18. The latch 82 is connected through a rod 83 to an arm 84 pivotally mounted within the casing 37 in position to be struck and raised by the toggle-link 47 as such link approaches the limit of its upward movement when the toggle collapses. The upward movement of the arm 84 is sufficient to release the latch 82 to permit the valves 16 and 17 to close under the influence of the spring 80.

The presence of the lost motion connection, provided by the slot 29, between the link 27 and the ventilation-control means makes possible the adjustment of the valve 20 without altering the position of the valves 16 and 17 when such valves are in open position. The adjustment of the valve 20 which is thus made possible is not complete, for the parts of my device are so arranged that when the valve-operated lever 25 is moved to the "off" position the upper end of the rod 36 will have engaged the toggle-link 47 and will have moved it upward sufficiently far to permit the collapsing of the toggle under the force exerted by the spring 40. When the toggle collapses, whether such collapsing is caused by the thermostat 55 or by the complete closing of the valve 20, the toggle-link 47 raises the arm 84 and the latch 82 to permit the ventilation-control valves 16 and 17 to close under the force exerted upon them by the spring 80.

I claim as my invention:

1. In combination with an oven having one or more ventilation openings, means for controlling the flow of air through said openings, a heating element located within said oven for heating said oven, regulating means for said heating element, said ventilation-control means being spring-pressed to closed position, a latch for holding said ventilation-control means in open position, and latch-operating means operatively interconnecting said latch and the regulating means for said heating element so that said latch will be released when said last-named means is operated to shut off said heating element.

2. The combination set forth in claim 1 with the addition of thermostatically controlled means for operating the regulating means for said heating element to shut said heating element off when the temperature within the oven reaches a predetermined value, and means for varying the temperature at which said thermostatically controlled means operates to shut off said heating element.

3. The combination set forth in claim 1 with the addition of thermostatically controlled means for operating the regulating means for said heating element to shut said heating element off when the temperature within the oven reaches a predetermined value.

4. In combination with an oven having one or more ventilation openings, means for controlling the flow of air through said openings, a heating element for heating said oven, regulating means for said heating element, said ventilation-control means being spring-pressed to closed position, a latch for holding said ventilation-control means in open position, and latch-operating means operatively interconnecting said latch and the regulating means for said heating element.

5. The combination set forth in claim 4 with the addition of thermostatically controlled means for operating the regulating means for said heating element to shut said heating element off when the temperature within the oven reaches a predetermined value.

6. In combination with an oven having one or more ventilation openings, means for controlling the flow of air through said openings, a heating element for heating said oven, regulating means for said heating element, said ventilation-control means being spring-pressed to closed position, a latch for holding said ventilation-control means in open position, and latch-operating means operatively interconnecting said latch and the regulating means for said heating element, said latch-operating means being arranged to permit a limited adjustment of the regulating means for said heating element without releasing said latch.

7. In combination with an oven having ventilation openings, means for controlling the flow of air through said openings, spring means tending to close said ventilation-control means, a heating element for said oven, regulating means for said heating element, spring means tending to operate said regulating means to shut off said heating element, a temperature-responsive device for preventing the operation of said regulating means by its associated spring means except when the temperature within said oven is at or above a predetermined temperature, a latch co-operating with said ventilation control means to hold such means in open position against the pressure of its associated spring means, and means for releasing said latch when said regulating means is operated to shut off said heating element.

8. In combination with an oven having one or more ventilation openings, means for controlling the flow of air through said openings, a heating element for heating said oven, regulating means for said heating element, means interconnecting said regulating means and said ventilation control means for opening said ventilation control means when said regulating means is operated to turn said heating element on, said interconnecting means including a lost-motion connection to permit a limited adjustment of said regulating means without affecting said ventilation-control means, and means operable to close said ventilation-control means when said regulating means is moved beyond the limit provided by said lost-motion connection in a direction to shut off said heating element.

9. The combination set forth in claim 8 with the addition of means for automatically operating said regulating means to shut off said heating element when the temperature within said oven reaches a predetermined maximum.

10. In combination with an oven having one or more ventilation openings, means for controlling the flow of air through said openings, a heating element for said oven, regulating means for said heating element, a spring tending to operate said regulating means to shut off said heating element, a toggle, said spring acting on said toggle and tending to collapse it, an abutment for preventing the collapsing of said toggle in one direction under the force exerted by said spring, temperature-responsive means for moving said toggle away from said abutment to permit the collapsing of said toggle in the opposite direction under the force exerted by said spring, and means operative upon the collapsing of said toggle for closing said ventilation control means.

11. In combination with an oven, a heating element for said oven, regulating means for said heating element, a spring tending to operate said regulating means to shut off said heating element, a toggle, said spring acting on said toggle and tending to collapse it, an abutment for preventing the collapsing of said toggle in one direction under the force exerted by said spring, and temperature-responsive means for moving said toggle away from said abutment to permit the collapsing of said toggle in the opposite direction under the force exerted by said spring.

12. In combination with an oven having one or more ventilation openings, means for controlling the flow of air through said openings, a heating element for said oven, regulating means for said heating element, a spring tending to operate said regulating means to shut off said heating element, a toggle, said spring acting on said toggle and tending to collapse it, an abutment for preventing the collapsing of said toggle in one direction under the force exerted by said spring, temperature-responsive means for moving said toggle away from said abutment to permit the collapsing of said toggle in the opposite direction under the force exerted by said spring, spring means tending to close said ventilation control means, a latch for retaining said ventilation control means in open position, and means operative upon the collapsing of said toggle for releasing said latch.

13. The combination set forth in claim 10 with the addition of means for moving said toggle away from said abutment to permit collapsing of said toggle when said regulating means is operated to shut off said heating element.

14. In combination with an oven having one or more ventilation openings, means for controlling the flow of air through said openings, a heating element for said oven, regulating means for said heating element, a spring tending to operate said regulating means to shut off said heating element, a toggle, said spring acting on said toggle and tending to collapse it, an abutment for preventing the collapsing of said toggle in one direction under the force exerted by said spring, means for moving said toggle away from said abutment to permit the collapsing of said toggle in the other direction when the regulating means is operated to shut off said heating element, and means operative upon the collapsing of said toggle for closing said ventilation control means.

15. The combination set forth in claim 14 with the addition of means interconnecting said regulating means and said ventilation control means for opening said ventilation control means when said regulating means is operated to turn said heating element on.

16. In combination, a heating element, regulating means therefor, spring means associated with said regulating means and operative when released to operate said regulating means to shut off said heating element, a latch for holding said spring means stressed, and temperature-responsive means operatively connected with said latch, said regulating means being free to move to regulate said heating element when said latch is holding said spring means stressed.

17. The combination set forth in claim 16, with the addition of latch-releasing means operative to release said latch when said regulating means is operated to shut off said heating element.

In witness whereof, I have hereunto set my hand at Shelbyville, Indiana, this 17th day of May, A. D. one thousand nine hundred and twenty six.

JOHN E. CHAMBERS.